Patented Nov. 13, 1934

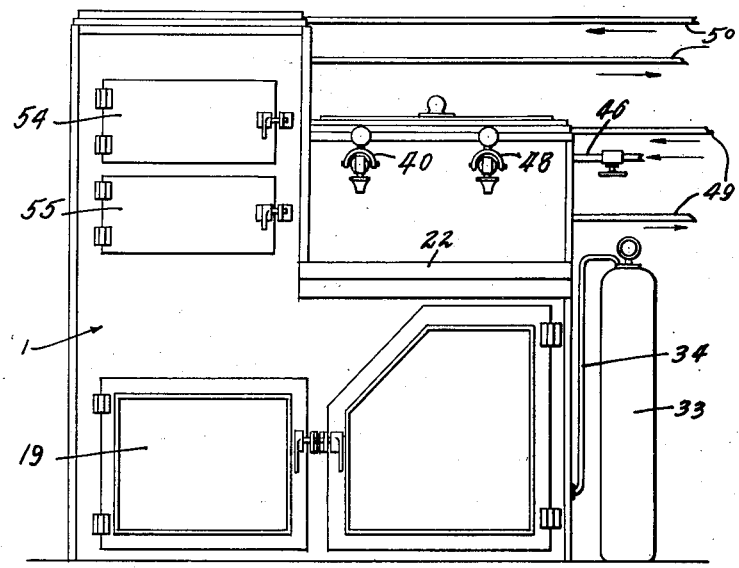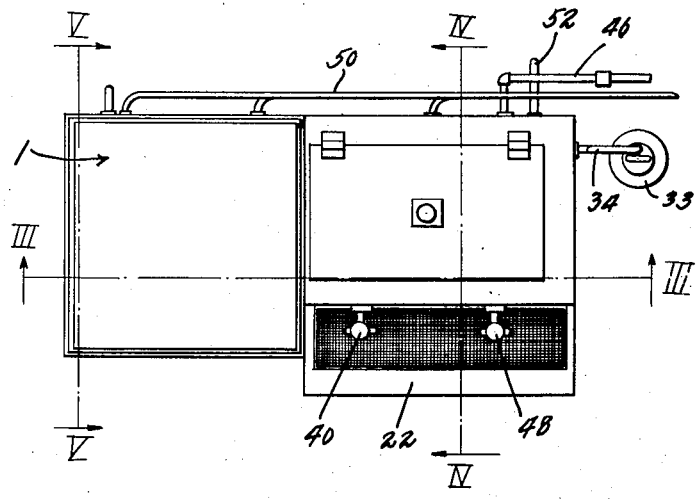

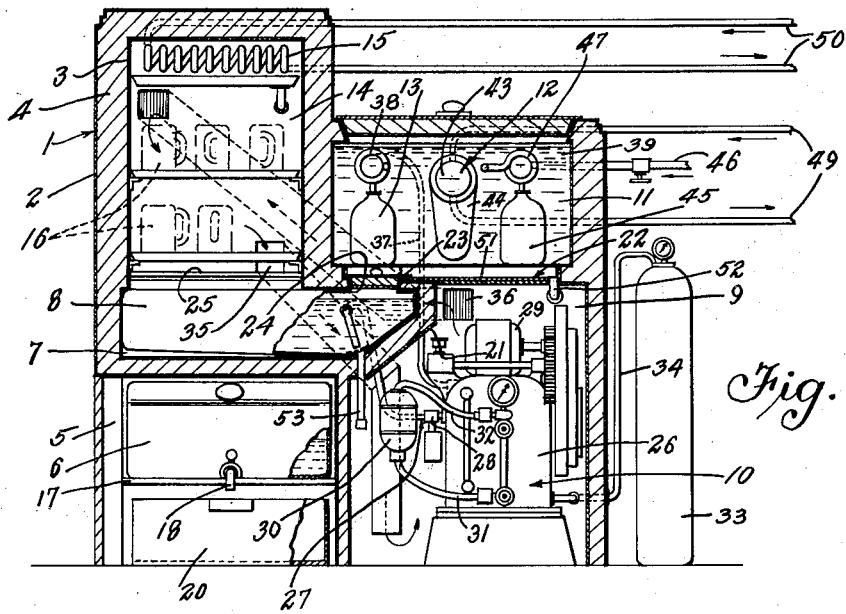
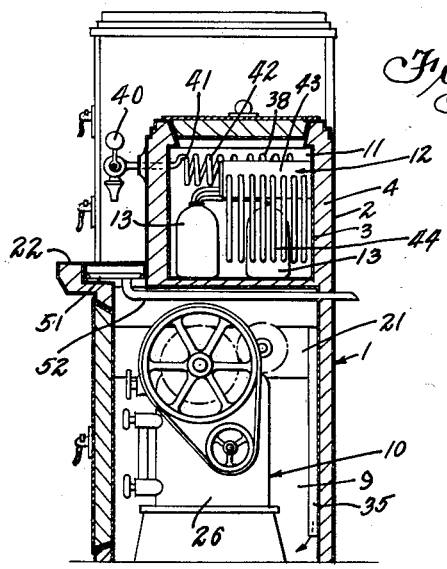
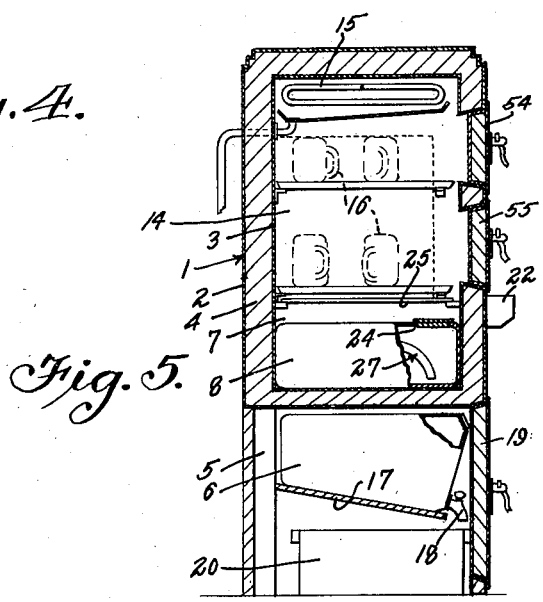

1,980,500

UNITED STATES PATENT OFFICE 1,980,500

DRAFT APPLIANCE FOR CARBONATED BEVERAGES

Lewis I. Reed, Berkeley, Calif.

Application April 16, 1932, Serial No. 605,652
Renewed July 23, 1934

8 Claims. (Cl. 225—21)

My invention relates to draft appliances for beverages, and has particular reference to a device for dispensing carbonated beverages, such as root beer, and the like.

In the art of making and dispensing carbonated beverages, it is necessary to first produce a concentrate of flavoring, which is then worked into the form of a flavoring syrup, then diluted to the desired strength with water, and then carbonated ready for dispensing. Heretofore each of these steps has been performed separately and the various constituents have been exposed to the atmosphere during the steps of the process requiring the mix to be cooled with each step.

For example, in the dispensing of root beer directly from a draft appliance, it has been the practice for the operator of an establishment selling root beer to maintain on hand a supply of root beer concentrate ready to be mixed, such concentrate being stored in any suitable manner and quantities thereof mixed with syrup from time to time to form a root beer base which is also stored for later dilution and carbonation. Also a quantity of the diluted mixture must be maintained at or near the draft appliance, so that a suitable supply, ready for carbonation and dispensing, may be at hand.

It has been the practice to store the root beer concentrate in a suitable cool place, such as a refrigerator, pending the mixing of the concentrate with syrup. During the mixing of the concentrate with the syrup it is removed from the refrigerator and mixed so that the temperature is raised to at least that of the atmospheric temperature after which the mix is again stored in the refrigerator to keep the same cool until it is to be used.

It has also been the practice to remove the mix from the refrigerator for dilution and carbonation after which the carbonated beverage must again be stored in a refrigerating device ready for dispensing from the draft appliance.

Each time the temperature of the product in its various steps is permitted to rise, the flavor of the product is injured, and, also, a greater quantity of refrigerant is required to restore the mix to a low temperature after its temperature has been raised than would be required to maintain the product at a low temperature.

It is, therefore, an object of my invention to provide a cabinet draft appliance for carbonated beverages, in which the beverage and each of its ingredients will be maintained at a low temperature during all of the steps of forming the beverage.

Another object of the invention is to provide a dispensing cabinet for carbonated beverages in which the concentrate, the syrup mix, and the completed beverage may all be maintained at a low temperature during the steps of mixing and producing the carbonated product.

Another object of the invention is to provide a single cabinet in which root beer concentrate, syrup mix, carbonator, and the finished carbonated beverage may all be maintained under refrigeration.

Another object of my invention is to provide a unitary cabinet, as set forth in the preceding paragraph, in which the vessels or receptacles in which the beverage is to be dispensed may be maintained at a low temperature to further assist in maintaining the low temperature of the beverage up to the time it is served to the consumer.

Another object of my invention is to provide a single cabinet which includes storage for a beverage concentrate, a syrup mix, and storage for the finished beverage in which a carbonator is included within the cabinet so that carbonation of the beverage occurs while the beverage is maintained at a low temperature.

Other objects and advantages will be apparent from a study of the following specifications, read in connection with the accompanying drawings, wherein Figure 1 is a front elevational view of a dispensing device constructed in accordance with my invention;

Figure 2 is a top plan view of the cabinet and dispensing device shown in Figure 1;

Figure 3 is a vertical sectional view, taken along line III—III of Figure 2;

Figure 4 is a vertical sectional view, taken along line IV—IV of Figure 2; and

Figure 5 is a sectional view, taken along line V—V of Figure 2.

Referring to the drawings, I have illustrated in Figure 1 a cabinet or casing 1 preferably formed of a construction similar to that of refrigerator cabinets, in that it comprises an outer wall 2 and an inner wall 3 substantially through the entire cabinet between which inner and outer walls suitable insulation 4 may be provided to prevent ready transmission of heat from the exterior to the interior of the cabinet.

The cabinet is illustrated as being substantially L-shaped when viewed from the front thereof to provide a plurality of different storage compartments, such as a housing compartment 5 for a suitable tank 6 to contain the root beer or other beverage concentrate. Another compartment 7 for housing a tank 8 which may contain a mixture of concentrate and syrup which has been diluted ready for carbonation, an additional compartment 9 in which is housed a carbonator 10 employed for inserting carbonic acid gas into the mixture drawn from the syrup mix tank 8, an additional compartment 11 containing suitable refrigerating apparatus 12, storage apparatus 13 for storing the finished carbonated beverage, and a still further compartment 14 which may be employed to house refrigerating apparatus 15 for cooling glasses 16 or other vessels in which the beverage is to be dispensed.

By referring particularly to Figures 2 and 5, it will be observed that the compartment 5 is divided into two sections by means of a shelf 17 upon which the concentrate tank 6 may rest. The tank 6 is illustrated as having an angularly shaped bottom, insuring drainage of liquids therein toward the front of the tank so that the contents of the tank may be withdrawn through a suitable faucet 18 without removing the tank from the cabinet. However, it will be observed that the front wall of the compartment 5 is formed by a relatively large door 19 which, when open, permits removal of the tank 6 for purposes of cleaning and repairing. The space below the shelf 17 may be employed for housing a suitable measure 20 employed as hereinafter described to measure the quantities of ingredients forming the completed beverage.

It will also be observed that the compartment 7 is provided with a portion 21 thereof which extends into a position immediately below a portion of the compartment 11. It will also be observed that the front wall of the compartment 11 is set somewhat rearwardly of the front wall of the compartment 7 so that a drain table 22, formed at the base of the compartment 11, extends immediately above the extending end of the compartment 7. By this construction a suitable filler opening 23 may be provided through the drain table 22 in alignment with a suitable filler opening 24 in the syrup mix tank 8, permitting access to the tank for purposes of filling and cleaning the same.

It will also be observed that the compartment 14, employed for cooling the glasses 16, communicates directly with the compartment 7 so that refrigeration equipment 15, employed to cool the glasses, may also provide a cooling medium for the syrup mix tank 8. A suitable perforated pan or plate 25 may be employed between the compartments 7 and 14 to lend a finished appearance to the interior of the compartment 14, but I prefer that such perforated plate be removable to permit additional access to the tank 8 to further assist in cleaning the tank.

The carbonator 10 is illustrated as being of any of the well-known types of carbonators, including a gas-liquid holder 26 communicating with the syrup mix tank 8 by means of a suitable pipe connection 27 so that liquid from the tank 8 may be supplied to the holder 26. A valve 28 is illustrated as being interposed in the connecting pipe 27 for the purpose of regulating the amount of liquid drawn from the tank to the holder 26. Carbonators of this character usually include a suitable pump (not shown), arranged to be driven by means of a driving motor 29 which is employed to draw liquid from the tank 8 to the holder 26. While the liquid may be supplied to the holder 26 by gravity, it will be understood by those skilled in the art that the introduction of carbonic acid gas into the holder 26 will create a pressure therein requiring that pressure be exerted upon the incoming liquid in order to force the same into the holder 26.

A suitable automatic valve operator may be employed to maintain the level of the liquid within the holder 26 at a desired value, such apparatus being illustrated at 30 as comprising a float which is connected through suitable tubing 31 and 32 to upper and lower levels within the holder 26 so that as the level of the liquid in the holder 26 varies the level of liquid in the float will vary until the weight of the liquid in the float arrives at a predetermined value necessary to operate the valve 28 preventing further supply of liquid to the holder.

A suitable reservoir 33 of carbonic acid gas may be located in any desired position and connected to the carbonator through a supply pipe 34 to supply gas from the reservoir to the holder 26 where the liquid is thoroughly mixed with the incoming gas.

In order that the proper mixing of gas and liquid shall occur in the carbonator, it is desirable that the liquid be maintained at a low temperature during the entire process of carbonation. With my cabinet not only is the liquid maintained at a low temperature but the entire carbonating apparatus may be maintained at a low temperature during the process of carbonation. This result is accomplished by providing a cold air vent 35 leading from the lower portion of the glass cooling compartment 14 to the lower portion of the carbonator compartment 9, while a return vent 36 may be employed to communicate between the upper end of the carbonator compartment 9 and the upper end of the glass cooling compartment 14 so that the cooling apparatus 15 if used for cooling the glasses also supplies a cooling medium for maintaining the temperature in the carbonating compartment at a low value. By employing such apparatus to cool the carbonator additional gas may be introduced into the liquid to provide a more highly charged beverage than is possible if the temperature of the carbonator is permitted to rise to atmospheric temperature.

The gas liquid holder 26 is illustrated as being connected through a pipe 37 to the carbonated beverage storage tank 13, the pipe 37 being preferably coiled, as is indicated at 38, prior to its entrance into the tank 13, so that a considerable area of the pipe 37 is exposed to a cooling liquid 39 contained within the compartment 11. In like manner, the reservoir 13 is connected to a suitable faucet 40 by means of an outlet pipe 41 which, like the pipe 37, preferably includes a coiled portion 42 thereof presenting a considerable area to the cooling effects of the liquid 39 within the compartment 11.

As hereinbefore described, the compartment 11 contains the refrigerating apparatus 12 which may consist of a suitable boiler 43 connected to a suitable compressor, (not shown), from which refrigerating gases may be supplied, the boiler 43 being provided with a plurality of coils or fins 44 to assist in distributing the cooling effect of the refrigeration medium to a considerable area in contact with the cooling liquid 11.

Thus the beverage is maintained at a low temperature from its introduction into the tank 8, through the process of carbonation to its storage as a finished beverage in the reservoir 13 and also during its passage from the reservoir 13 until it emerges from the faucet 40 ready for consumption, By maintaining the glasses or vessels 16 at a low temperature, the cooled beverage is drawn into a cold vessel so that the cooling effects are maintained for a considerable length of time after drawing the beverage from the faucet 40.

If desired, the compartment 11 may also be employed for the purpose of cooling water for drinking purposes by including a water reservoir 45 within the compartment 11 and connecting the same to a suitable source of supply 46 through a cool pipe 47 similar to the pipe 37. A water faucet 48 may be connected to the reservoir 45 through which cooled water may be drawn.

While I have shown two separate refrigeration units 12 and 15, one for cooling the finished beverage and the other for cooling the glasses and carbonator, each of these refrigeration units is illustrated as being connected separately through pipes 49 and 50, respectively, to a compressor (not shown), it will be understood that they may be connected to the compressor in series relation instead of separately. However, by employing separate connections for each of the cooling or refrigeration units, different temperatures may be maintained respectively in the two units. For example, I may maintain the compartment 11 at a temperature of 40° F., which is above the freezing point but which insures a cool beverage, while at the same time I may maintain the compartment 14 at a temperature below the freezing point, for example at 10 or 15° F. so that the glass will not only tend to maintain the temperature of the beverage when placed therein, but also may be employed to further cool the beverage.

By referring particularly to Figure 2, it will be observed that the drain table 22, immediately below the faucets 40 and 48 is provided with a drain pan 51 which may be connected through a suitable drain pipe 52 to a waste tank or waste pipe system, and also that the syrup mix tank 8 is provided with a drain pipe 53 permitting connection thereof to the waste system, thus permitting the tank 8 to be readily flushed and cleaned.

It will therefore be observed that I have provided a storage and mixing device for beverages which forms a complete unit for maintaining the beverage and its ingredients at a low temperature during the entire process of making and dispensing the beverage and, in addition, may be employed to cool the vessels in which the liquid is to be dispensed to insure the delivery of the liquid to the consumer as a completed and cooled drink.

If desired, the glass cooling compartment may be divided into separate sections, each of which may be communicated with through a separate door, such as is illustrated at 54 and 55 in Figures 1 and 5, so that while glasses from one section of the compartment are being used the glasses in the other section will not be permitted to become heated.

While I have shown and described the preferred embodiment of my invention, I do not wish to be limited to any of the details of construction shown herein, except as defined in the appended claims.

I claim:

1. In a carbonated beverage dispensing device, a cabinet having a plurality of compartments for housing a syrup mix storage tank, a carbonator, a carbonated beverage storage reservoir, means interconnecting said syrup tank with said carbonator, means interconnecting said carbonator and said carbonated beverage reservoir, a faucet on the front of said cabinet connected immediately to said carbonated beverage reservoir, a dispensing vessel-cooling compartment in said cabinet, refrigeration means in said last named compartment, and means intercommunicating said last named compartment with said syrup tank compartment and said carbonator whereby said refrigeration element maintains the temperature of said syrup tank and said carbonator at a low value.

2. In a carbonated beverage dispensing device, a cabinet having a plurality of compartments for housing a syrup mix storage tank, a carbonator, a carbonated beverage storage reservoir, means interconnecting said syrup tank with said carbonator, means interconnecting said carbonator and said carbonated beverage reservoir, a faucet on the front of said cabinet connected immediately to said carbonated beverage reservoir, a dispensing vessel-cooling compartment in said cabinet, refrigeration means in said last named compartment, means intercommunicating said last named compartment with said syrup tank compartment and said carbonator whereby said refrigeration element maintains the temperature of said syrup tank and said carbonator at a low value, and additional refrigeration means in said carbonated beverage reservoir compartment for further cooling said beverage.

3. In a carbonated beverage dispensing device, a cabinet having a plurality of compartments for housing a syrup mix storage tank, a carbonator, a carbonated beverage storage reservoir, means interconnecting said syrup tank with said carbonator, means interconnecting said carbonator and said carbonated beverage reservoir, a faucet on the front of said cabinet connected immediately to said carbonated beverage reservoir, a dispensing vessel-cooling compartment in said cabinet, refrigeration means in said last named compartment, means intercommunicating said last named compartment with said syrup tank compartment and said carbonator whereby said refrigeration element maintains the temperature of said syrup tank and said carbonator at a low value, a drain table on the front of said cabinet immediately below said faucet, said syrup tank extending below said drain table, and an entrance opening to said syrup tank extending through said drain table.

4. In a beverage dispensing device, a cabinet having a dispensing vessel compartment and a prepared beverage compartment, refrigeration means in said vessel compartment for cooling vessels therein to a low temperature, means interconnecting said two compartments to circulate a portion of the cold air in said vessel compartment through said prepared beverage compartment to cool stored beverage to a low temperature but above that of the vessel compartment, and draft means on said cabinet connecting with said beverage compartment for drawing beverage therefrom.

5. In a beverage dispensing device, a unitary refrigeration cabinet having a dispensing vessel compartment, a prepared beverage compartment, refrigeration means in said vessel compartment for cooling vessels therein to a temperature below freezing, means interconnecting said two compartments to circulate a portion of the cold air from said vessel compartment through said prepared beverage compartment to cool said stored beverage to a temperature above freezing, and draft means connecting said beverage compartment for drawing beverage therefrom.

6. In a beverage dispensing device, a unitary refrigeration cabinet having a dispensing vessel compartment, a prepared beverage compartment and a syrup storage compartment, a wall separating said vessel compartment and said prepared beverage compartment permitting direct heat exchange therebetween, refrigeration means in said vessel compartment for maintaining said compartment at a low temperature, and means interconnecting said vessel compartment and said prepared beverage compartment to circulate a portion of the cold air in said vessel compartment through said prepared beverage compartment to cool said beverage to a low temperature but above that of said vessel compartment.

7. An article of manufacture comprising a refrigeration cabinet having a drinking vessel storage compartment and refrigeration means therein for cooling vessels to a temperature below freezing and having a prepared beverage compartment for holding a supply of prepared beverage, and air circulating means connecting said two compartments to circulate a portion of the cold air in said vessel compartment to said beverage compartment to cool the same to a temperature above freezing, and draft means on said cabinet for drawing beverage from said beverage compartment.

8. In a dispensing fountain for serving root beer a unitary refrigeration cabinet having a dispensing vessel compartment, refrigeration means therein for maintaining the temperature therein below freezing, a root beer mixture storage compartment communicating with said vessel compartment for direct heat exchange therewith, a carbonator compartment having a carbonator therein for supplying carbonic acid gas to said mixture, and means for circulating a portion of the cold air from said vessel compartment through said carbonator compartment to maintain the temperature therein at a low value but above freezing.

LEWIS I. REED.